(12) United States Patent
Shinobu

(10) Patent No.: US 6,565,214 B1
(45) Date of Patent: May 20, 2003

(54) ENCLOSURE FOR PROJECTION TELEVISION SETS

(75) Inventor: Masayoshi Shinobu, Kyoto Fu (JP)

(73) Assignee: Mitsubishi Digital Electronics America, Inc., Irvine, CA (US)

( * ) Notice: Subject to any disclaimer, the term of this patent is extended or adjusted under 35 U.S.C. 154(b) by 152 days.

(21) Appl. No.: 09/652,716

(22) Filed: Aug. 31, 2000

(51) Int. Cl.[7] .............................................. G03B 21/22
(52) U.S. Cl. .............................. 353/74; 353/77; 353/61; 353/119; 348/748; 348/760; 348/778; 348/787; 348/789; 348/843
(58) Field of Search ............................... 353/31, 47, 74, 353/77, 61, 79, 119, 57, 58, 60, 63, 64, 65, 66, 67; 348/744, 748, 760, 776, 778, 786, 787, 789, 805, 808, 825, 836, 843

(56) References Cited

U.S. PATENT DOCUMENTS

| | | | |
|---|---|---|---|
| 3,914,547 A | | 10/1975 | Callender .................... 178/7.9 |
| 4,644,408 A | | 2/1987 | Coleman .................... 358/254 |
| 5,631,715 A | * | 5/1997 | Kirkpatrick et al. ......... 348/839 |
| 5,639,151 A | * | 6/1997 | McNelley et al. ............ 353/98 |
| 5,675,131 A | | 10/1997 | Saito et al. .................. 181/152 |
| 5,808,704 A | * | 9/1998 | Yoshikawa et al. ......... 348/748 |
| 5,929,945 A | * | 7/1999 | Negishi et al. ............. 348/825 |
| 6,028,701 A | * | 2/2000 | Gulick et al. ............... 359/443 |
| 6,327,082 B1 | * | 12/2001 | Browning .................... 359/443 |
| 2001/0022650 A1 | * | 9/2001 | Ono ............................. 353/52 |
| 2001/0043290 A1 | * | 11/2001 | Yamamoto ................... 348/836 |
| 2001/0046035 A1 | * | 11/2001 | Vanderwerf et al. ........ 353/119 |

* cited by examiner

Primary Examiner—Russell Adams
Assistant Examiner—Melissa J Koval
(74) Attorney, Agent, or Firm—Orrick, Herrington & Sutcliffe LLP

(57) ABSTRACT

A projection television set having an enclosure housing a screen, an optical unit and a mirror, wherein the optical unit and mirror are capable of projecting an image onto the screen. The enclosure is preferably constructed from hollow plastic extruded panels. In addition, the enclosure preferably includes a duct extending upwardly from a lower portion of the enclosure to exhaust heat radiating from components housed therein to the exterior of the enclosure toward the top of the enclosure.

45 Claims, 4 Drawing Sheets

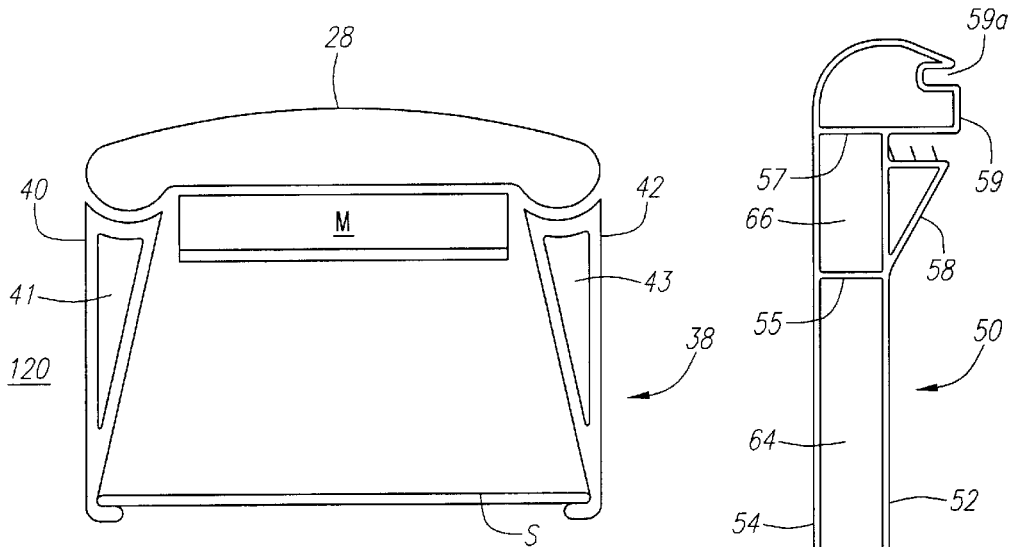
FIG. 4
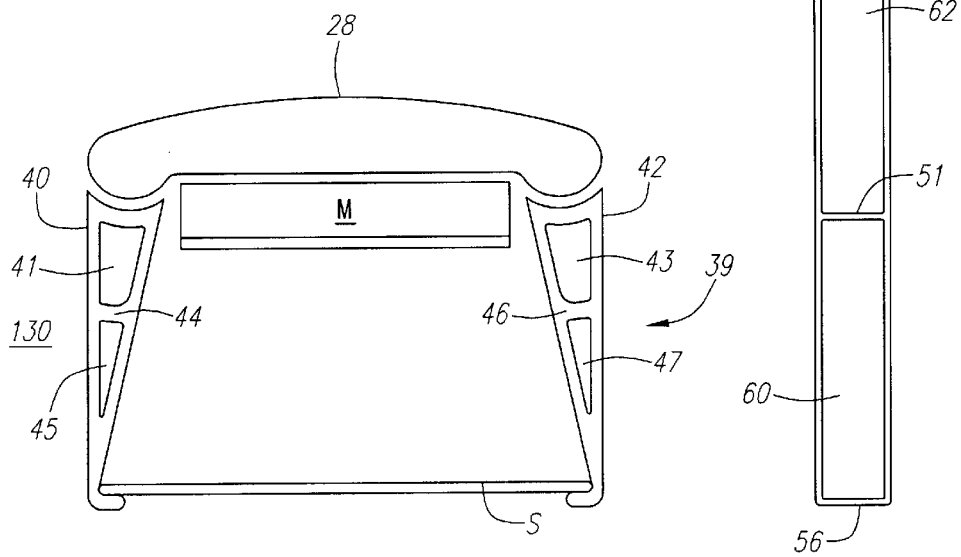
FIG. 5
FIG. 6

ENCLOSURE FOR PROJECTION TELEVISION SETS

FIELD OF THE INVENTION

The present invention relates generally to projection television sets, and more particularly to a projection television set enclosure.

BACKGROUND OF THE INVENTION

Projection television (PTV) sets are a popular alternative to picture tube television sets, as they provide relatively large viewable screens that cannot be efficiently produced using conventional picture tubes. PTV sets typically include an enclosure housing an optical unit, a mirror, and electronic components for receiving and projecting an image onto a screen assembly mounted on the front of the enclosure. The optical unit typically includes three projection tubes having a cathode ray tube (CRT) optically coupled to a projection lens. The three projection tubes project a red, a green, and a blue image on to a screen of the PTV.

The conventional enclosure is typically divided into two compartments, an upper and a lower compartment. The CRTs and the printed wiring boards (PWB) are typically mounted in the lower compartment, the mirror and screen are mounted in the upper compartment, and the projection lens tends to extend from the lower compartment to the upper compartment. The upper compartment is typically sealed tightly in order to protect the inside of the compartment from dust and other foreign materials. The lower compartment typically includes ventilation holes, positioned adjacent the top and bottom of the compartment, to exhaust heat radiating from the CRTs and the PWBs.

Although durable, conventional enclosures or cabinets, which are formed from wood or molded plastic, are typically big, bulky and, as a result, quite heavy. As the screens of the PTVs increase in size, the cabinets become bigger and heavier. In an effort to reduce the size and weight of the PTVs, manufacturers have begun shrinking the size of the cabinets. However, shrinking a conventional cabinet to reduce the size and weight of a PTV, means shrinking the lower compartment. When the lower compartment is shrunk, much of the peripheral space surrounding the CRTs and PWBs is eliminated and the ventilation holes are drawn closer together. As a result, heat radiation problems tend to arise that can lead to deterioration in component performance and reliability.

Therefore, it would be desirable to provide a durable PTV cabinet that is lighter and smaller, and that includes high heat radiation performance characteristics.

SUMMARY OF THE INVENTION

The present invention is directed to an improved enclosure or cabinet for PTVs. The PTV enclosures or cabinets of the present invention tend to reduce the overall weight and size of the PTVs, and improve heat radiation performance and, thus, PTV component performance and reliability. In one particularly innovative aspect of the present invention, the enclosure or cabinet includes panels that are formed from extruded material such as plastic. Moreover, an enclosure in accordance with the present invention preferably comprises hollow or partially hollow channels within the extruded panels.

In another particularly innovative aspect of the present invention, the enclosure or cabinet includes a ventilation duct having a first opening adjacent a lower compartment or the heat radiating components and a second opening adjacent the top of the enclosure or cabinet. Preferably, the first opening opens into the interior of the lower compartment of the enclosure, or simply adjacent the heat radiating components, and the second opening opens to the exterior of the enclosure at a location adjacent the top of the enclosure. Alternatively, the first opening of the ventilation duct opens to the interior of the enclosure adjacent the heat radiating components or lower compartment and the second opening also opens into the interior of the upper compartment adjacent the top of the enclosure.

In yet another innovative aspect of the present invention, the ventilation duct is formed from a hollow or partially hollow channel of an extruded enclosure panel.

Other objects and features of the present invention will become apparent from consideration of the following description taken in conjunction with the accompanying drawings.

BRIEF DESCRIPTION OF DRAWINGS

FIG. 4 is a top view of a projection television set of the present invention.

FIG. 5 is a top view of a second embodiment of a projection television set of the present invention FIG. 6 is a top view of a side panel a projection television set of the present invention.

DETAILED DESCRIPTION OF PREFERRED EMBODIMENT

Although the present invention is applicable to enclosures or cabinets for a variety of display devices such as digital light projection televisions, liquid crystal displays, etc., the following discussion focuses on enclosures or cabinets for projection television (PTV) sets for exemplary purposes only.

Figure 1:
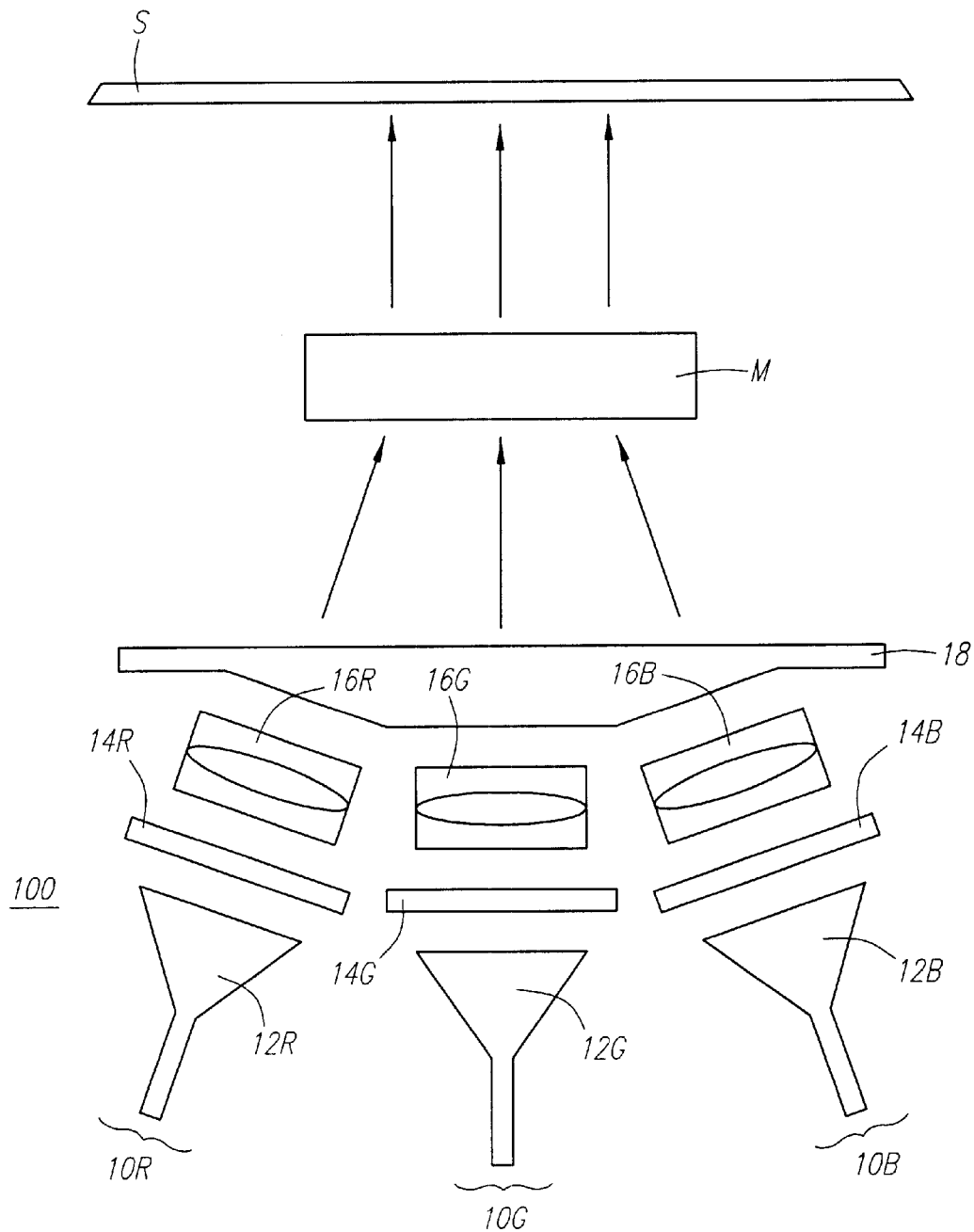
FIG. 1 is a schematic view of a projection television set of the prior art.

Referring to FIG. 1, the components of a PTV set 100 are schematically shown to include a mirror M and three projection tubes 10R, 10G, and 10B for receiving and projecting a red, a green, and a blue image onto a screen S assembly mounted on the front of an enclosure (not shown). Each projection tube 10R, 10G, and 10B includes a cathode ray tube (CRT) 12 R, 12G, and 12B optically coupled to a projection lens 16R, 16G, and 16B. A spacer 14R, 14G, and 14B is coupled to and between the CRTs 12R, 12G, and 12B and lenses 16R, 16G, and 16B. The assembled projection tubes 10R, 10G, and 10B are mounted to an enclosure mounting bracket 18 to position them in their correct angular orientation within the enclosure.

Figure 2:
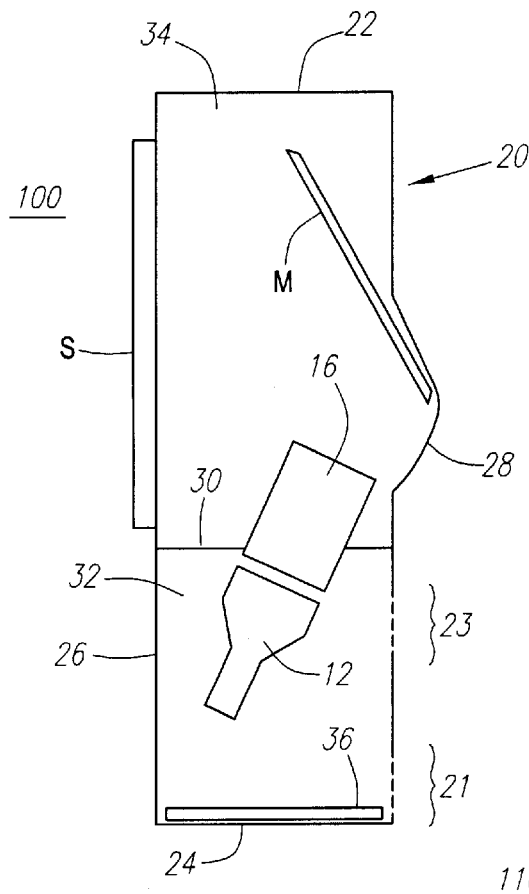
FIG. 2 is a side view of a projection television set of the prior art.

Turning to FIG. 2, the conventional enclosure 20 of a PTV 100 includes top 22, bottom 24, front 26, rear 28, and first 40 and second 42 side (see FIGS. 4 and 5) panels, and is typically divided by an internal wall 30 into two compartments, i.e., upper 34 and lower 32 compartments. The CRTs 12 and printed wiring boards (PWBs) 36 are typically mounted in the lower compartment 32, while the mirror M and screen S are mounted in the upper compartment 34. The projection lens 16 typically extends from the lower compartment 32 into the upper compartment 34 through the internal wall 30. The upper compartment 34 is typically tightly sealed from the lower compartment 32 to protect the inside of the upper compartment 34 from dust and other foreign materials. The lower compartment 32 typically includes one or more sets of ventilation holes to exhaust heat radiating from the CRTs 12 and the PWBs 36. As shown, the lower compartment 32 includes a first set of holes 23 positioned adjacent the top of the lower compartment 32 and a second set of holes 21 positioned adjacent the bottom of the lower compartment 32.

Figure 3:
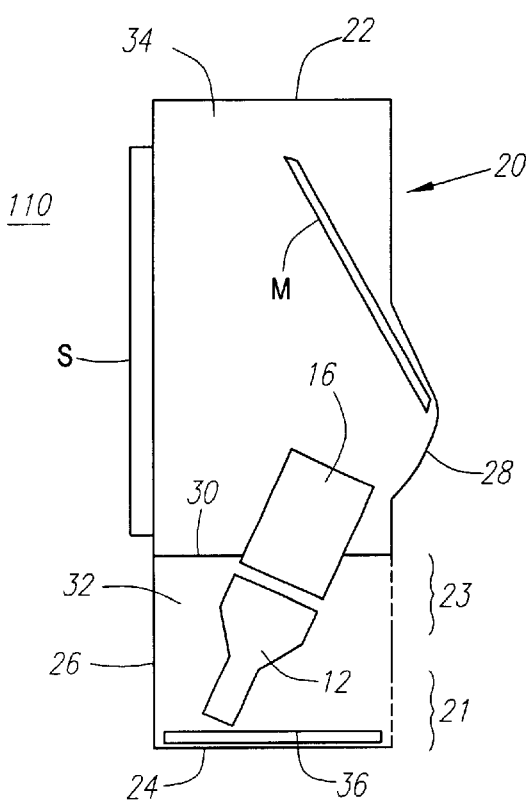
FIG. 3 is a side view of another projection television set of the prior art.

As shown in FIG. 3, manufacturers have attempted to reduce the size and weight of the PTVs 110 by shrinking the size of the cabinets or enclosures 20. However, shrinking a conventional cabinet 20 to reduce the size and weight of the PTV 110, means shrinking the lower compartment 32. When the lower compartment 32 is shrunk, much of the peripheral space surrounding the CRTs 12 and PWBs 36 in the lower compartment 32 is eliminated and the ventilation holes 21 and 23 are drawn close together. As a result, heat radiation problems tend to arise from poor ventilation and close component proximity, which tend to lead to deterioration in component performance and reliability.

Turning to FIGS. 4–8, PTV enclosures or cabinets of the present invention are shown. Referring to FIGS. 4 and 5, the PTVs 120 and 130 are shown to include weight reducing enclosures or cabinets 38 and 39. The cabinets 38 and 39 include first 40 and second 42 side panels formed from extruded plastic and a rear panel 28 constructed from form polystyrene. The extruded side panels 40 and 42 of the first cabinet 38 (see FIG. 4), include a single cavity or channel 41 and 43 formed therein and which is preferably hollow. The material eliminated from the channels 41 and 43 tends to reduce the weight of the panels 40 and 42 without reducing their durability. To make a larger cabinet 39 (see FIGS. 5 and 6), or further reduce the weight of a cabinet, the side panels can be extruded with two or more hollow or partially hollow channels. As shown in FIG. 5, the first and second side panels 40 and 42, respectively, are each extruded with two channels 41 and 45 and 43 and 47, respectively, which are preferably hollow and partitioned by walls 44 and 46, respectively.

Turning to FIG. 6, the side panel 50 of a PVT enclosure or cabinet is preferably formed as a thin walled extrusion. The outer walls 52, 54, 56, 58 and 59 are preferably 1.2 mm to 1.5 mm thick while the inner cross-member walls 51, 53, 55, and 57 are preferably 1.0 mm to 1.2 mm thick. The inner cross-member walls 51, 53, 55, and 57 and end wall 56 form cavities or channels 60, 62, 64, and 66 there between, which are preferably hollow.

Figure 7:
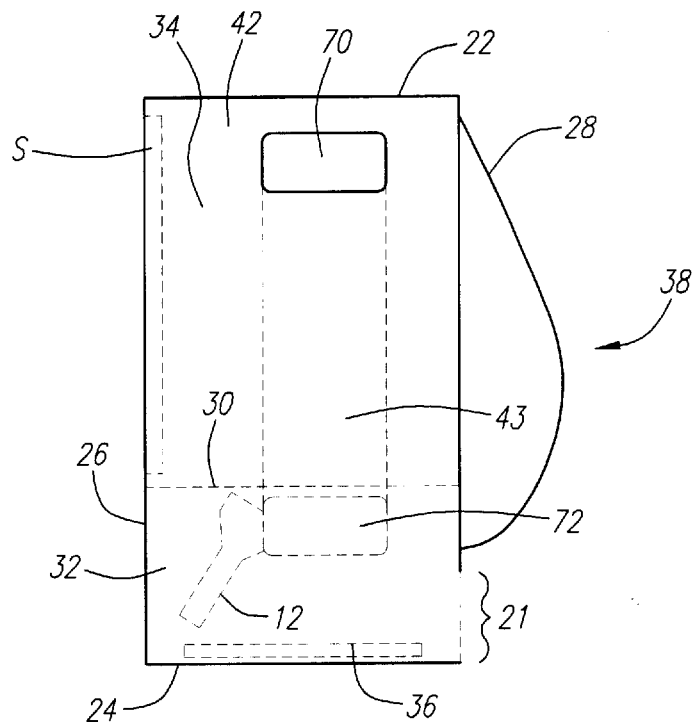
FIG. 7 is a side view of the projection television set shown in FIG. 4.
Figure 8:
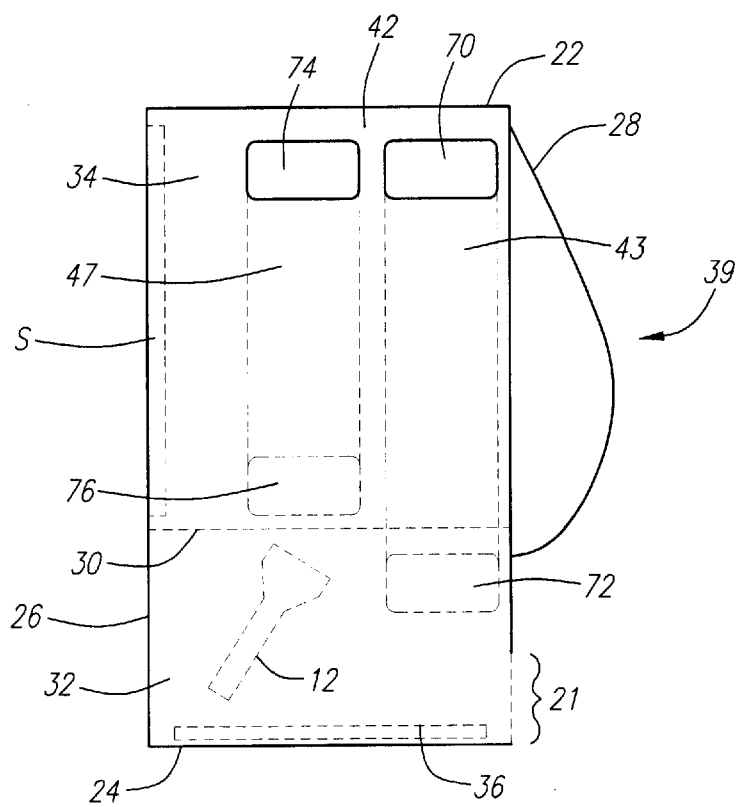
FIG. 8 is a side view of the projection television set shown in FIG. 5.

Referring to FIGS. 7 and 8, the hollow channel 43 formed in side panel 42 (see FIGS. 4 and 5) is preferably converted into a ventilation duct to exhaust heat radiating from the CRT and PWBs and, thus, reduce operating temperatures. The ventilation duct includes a first opening 72 adjacent the lower compartment 32 or the CRTs 12 and PWBs 36, and a second opening 70 adjacent the top of the enclosure 38. Although the first opening 72 could be located anywhere adjacent the lower compartment 32, it preferably opens into the interior of the lower compartment 32 and is located adjacent the top of the lower compartment 32 because the heat radiating from the CRTs 12 and PWBs 36 will tend to rise and be trapped at the top of the lower compartment 32 by internal wall 30. Although the second hole 70 could open into the interior of the upper compartment 34, it preferably opens to the exterior of the enclosure 38. With air ventilation holes 21 cut in the rear panel 28 to vent air into the lower compartment 32 and the second or exhaust opening 70 of the ventilation duct 43 being toward the top of the enclosure 38 and opening to the exterior of the enclosure 38, the ventilation duct 43 tends to have a chimney effect, i.e., an upward draft is induced and maintained through the ventilation duct 43. As a result, heat radiating from the CRTs 12 and PWBs 36 tends to be exhausted from the lower compartment 32 out through the ventilation duct 43, and the temperature within the lower compartment advantageously tends to be reduced.

In FIG. 8, a second ventilation duct is created by adding first 76 and second 74 openings to the hollow channel 47 formed in the side panel 42 (see FIG. 5). The first opening 76 opens into the interior of the upper compartment 34 adjacent the lower compartment 32. The second opening 74 can open to the interior of the upper compartment 34 towards its top to vent heat radiating from the lower compartment 32 to the top of the upper compartment 34 while maintaining a sealed compartment. However, if the second opening 74 opens to the exterior of the enclosure 39 as shown, a filter may need to be included in the duct 47 to protect the compartment from dust and other foreign particles.

One skilled in the art would understand that the location of the first and second openings may vary depending on the desired heat dissipation effect. In addition, the construction of the ducts may also vary, such that the ducting need not be integrally formed with a panel of the enclosure, but rather may be separate ducting attached to the enclosure and penetrating the interior of the enclosure at desired locations. Other alternatives may include forming panels out of multiple pieces wherein channels are formed in the panels by placing spacers between pieces of the multi-piece panels or by cutting or molding a channel into one of the pieces of the multi-piece panel.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed:

1. A projection television set comprising a screen, a mirror optically coupled to said screen, an optical unit optically coupled to said mirror and screen, an enclosure housing said screen, mirror, and optical unit, said enclosure including an extruded panel, and a ventilation duct extending upwardly from a lower portion of said enclosure toward and adjacent to a top of said enclosure.

2. The projection television set of claim 1, wherein at least a portion of said panel is hollow forming said ventilation duct.

3. The projection television set of claim 2, wherein said panel is formed from extruded plastic.

4. The projection television set of claim 1 further comprising upper and lower compartments.

5. The projection television set of claim 4, wherein said optical unit comprises a plurality of cathode ray tubes (CRTs) coupled to projection lenses, said CRTs being housed in said lower compartment.

6. The projection television set of claim 1, further comprising a ventilation duct extending upwardly from a lower portion of said enclosure toward a top of said enclosure.

7. The projection television set of claim 1, wherein said venitilation duct includes first and second openings, said first opening being open to the interior of the lower portion of the enclosure.

8. The projection television set of claim 4, wherein said ventilation duct extends upwardly from said lower compartment along at least a portion of said upper compartment.

9. The projection television set of claim 8, wherein said duct includes a first opening that opens into an interior of said lower compartment and a second opening.

10. The projection television set of claim 9, wherein said second opening opens to the exterior of said enclosure along said upper compartment.

11. The projection television set of claim 8, wherein said duct includes a first end and a second end, and wherein said first and second openings are positioned adjacent said first and second ends of said duct.

12. The projection television set of claim 1, wherein said duct is integrally formed in a wall of said enclosure.

13. The projection television set of claim 1, wherein said duct comprises an extruded channel formed in a wall of said enclosure.

14. A projection television set comprising a screen, an optical unit optically coupled to said screen, a cabinet housing said screen and optical unit, said cabinet including a ventilation duct extending upwardly from a lower portion of said cabinet toward a top of said cabinet within a wall of said cabinet.

15. The projection television set of claim 14, wherein said duct is integrally formed in said wall of said cabinet.

16. The projection television set of claim 14, wherein said cabinet includes an extruded panel.

17. The projection television set of claim 16, wherein said duct comprises a channel formed in said extruded panel.

18. The projection television set of claim 16, wherein said cabinet is plastic.

19. The projection television set of claim 14, wherein said duct has a first opening that opens into an interior of a lower portion of said cabinet, and a second opening that opens to an exterior of said cabinet.

20. The projection television set of claim 14, wherein said cabinet includes an upper and lower compartment and wherein said duct includes a first opening that into the interior and adjacent the top of said lower compartment.

21. The projection television set of claim 14, wherein said duct includes a first end and a second end, and wherein said first and second openings are positioned adjacent said first and second ends of said duct.

22. An enclosure for display units comprising a top panel, a bottom panel, first and second side panels connected to said top and bottom panels, wherein at least one of said first and second side panels is formed as an extrusion, a front panel connected to said first and second side panels and said bottom panel, a back panel connected to said first and second side panels and said top and bottom panels, and a ventilation duct extending upwardly from a lower portion of the enclosure toward a top of the enclosure within one of said first or second side panels.

23. The enclosure of claim 22, wherein said enclosure is plastic.

24. The enclosure of claim 22, further comprising a ventilation duct extending upwardly from a lower portion of the enclosure toward a top of the enclosure.

25. The enclosure of claim 22 further comprising upper and lower compartments.

26. The enclosure of claim 25, wherein said ventilation duct extends upwardly from said lower compartment along at least a portion of said upper compartment.

27. The enclosure of claim 26, wherein said duct includes a first opening that opens into an interior of said lower compartment and a second opening that opens adjacent the top of said upper compartment.

28. The enclosure of claim 27, wherein said second opening opens to the exterior of said enclosure along said upper compartment.

29. The enclosure of claim 22, wherein said duct is integrally formed in one of said side panels.

30. The enclosure of claim 22, wherein said duct comprises an extruded channel formed in one of said side panels of said enclosure.

31. A display device cabinet comprising a housing comprising top, bottom, front, rear, and first and second side panels, and a duct extending upwardly from a lower portion of said housing toward an upper portion of said housing within a panel of said housing.

32. The cabinet of claim 31, wherein said duct is integrally formed in said panel of said cabinet.

33. The cabinet of claim 31, wherein said cabinet includes an extruded panel with at least a portion that is hollow.

34. The cabinet of claim 33, wherein said duct comprises a channel formed in said extruded panel of said cabinet.

35. The cabinet of claim 33, wherein said cabinet is plastic.

36. The cabinet of claim 31, wherein said duct has a first opening that opens into an interior in a lower portion of said housing, and a second opening that opens adjacent the top of said cabinet.

37. The cabinet of claim 31, wherein said housing includes upper and lower compartment, and wherein said duct includes a first opening that opens into an interior of said lower compartment and a second opening that opens to an exterior of said cabinet along said upper compartment.

38. The cabinet of claim 36, wherein said duct includes a first end and a second end, and wherein said first and second openings are positioned adjacent said first and second ends of said duct.

39. A method of cooling a display unit cabinet, comprising the steps of directing heat from a lower portion of an enclosure toward a top of said enclosure through a ventilation duct, and exhausting heat from the duct adjacent said top of said enclosure.

40. The method of claim 39, further comprising the step of drawing the heat from said lower compartment in an upward direction.

41. The method of claim 39, wherein the directing step further comprises the step of directing heat from a lower portion of said enclosure through a duct extending upwardly within a panel of said enclosure.

42. The method of claim 41, further comprising the step of forming the duct integrally with said panel of said enclosure.

43. The method of claim 41, further comprising the step of forming the enclosure with an extruded panel wherein the duct comprises a hollow channel formed in the extruded panel.

44. The method of claim 41, wherein the duct includes a first opening that opens into an interior of a lower portion of said enclosure, and a second opening that opens to an exterior of said enclosure.

45. The method of claim 44, wherein said duct includes a first end and a second end, and wherein said first and second openings are positioned adjacent said first and second ends of said duct.

* * * * *